Aug. 23, 1966  J. E. MURPHY, JR., ET AL  3,268,054
METHOD AND APPARATUS FOR ASSEMBLING AND
FEEDING GROUPS OF ARTICLES
Filed Dec. 12, 1963  3 Sheets-Sheet 1
FIG.IA.
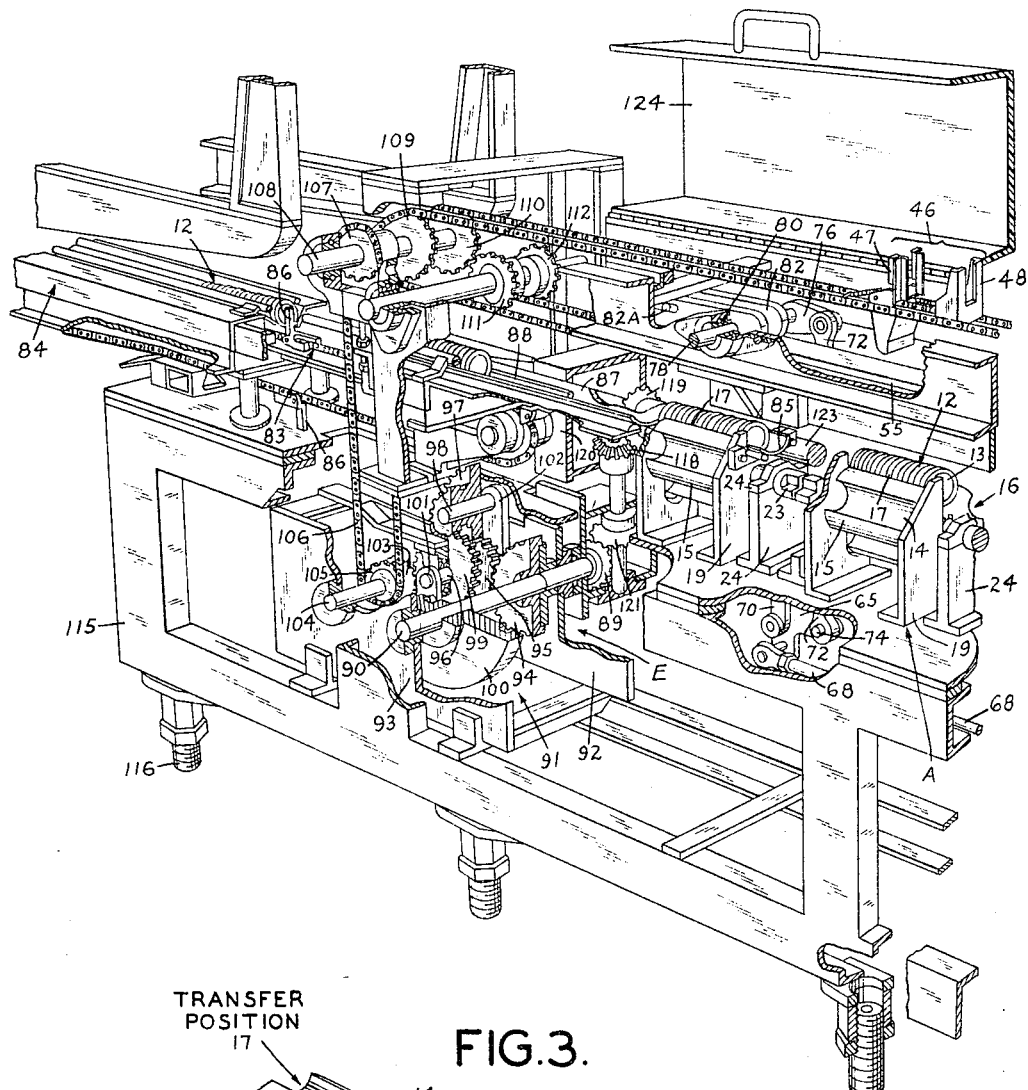
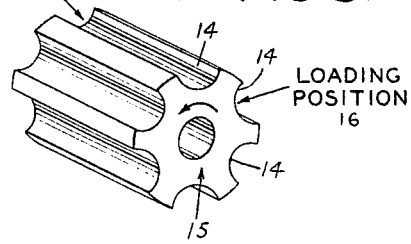
FIG.3.
INVENTORS
JOHN E. MURPHY, JR.
DONALD M. JOHNSON
BY
THEIR ATTORNEYS

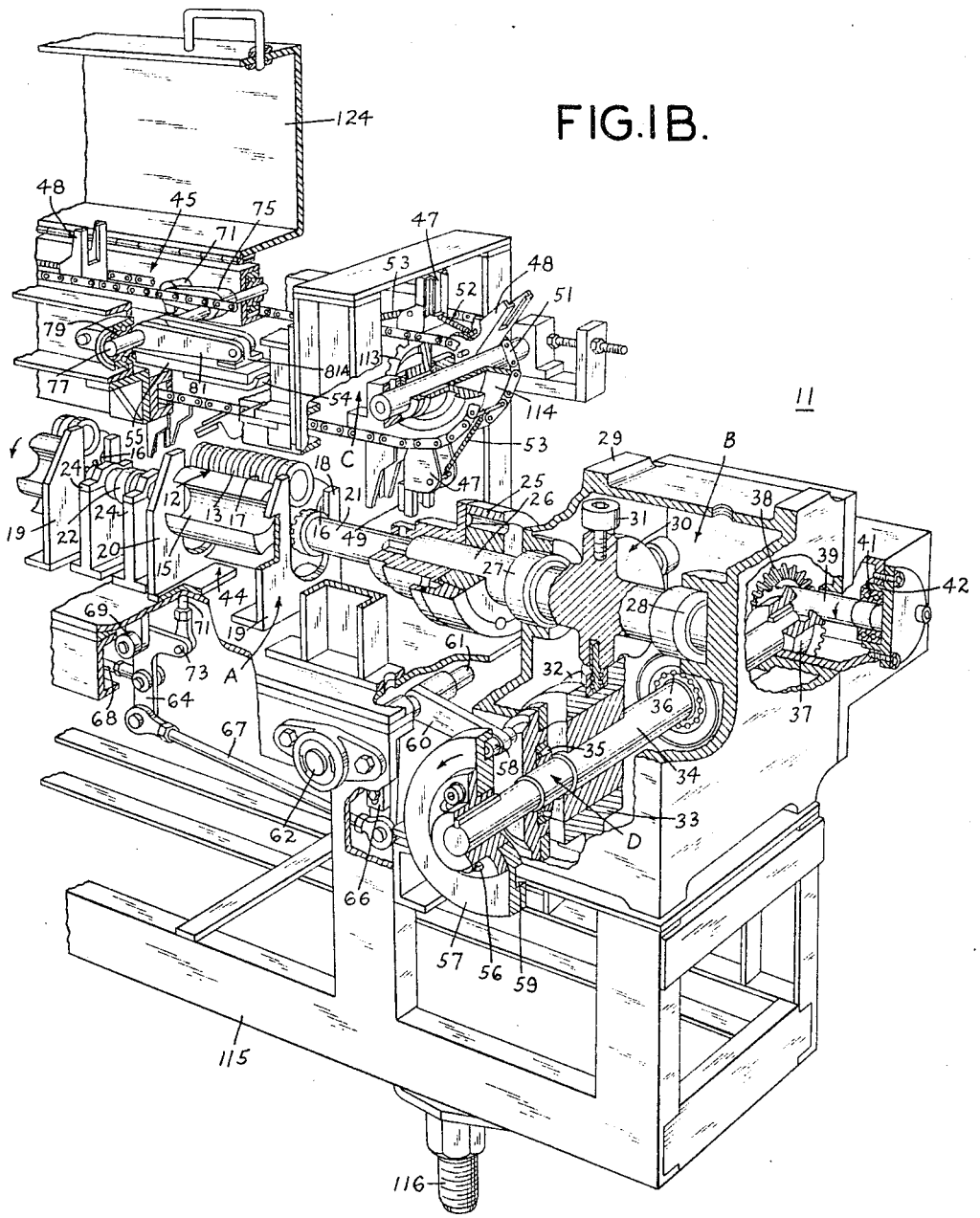

Aug. 23, 1966       J. E. MURPHY, JR., ET AL       3,268,054
          METHOD AND APPARATUS FOR ASSEMBLING AND
                   FEEDING GROUPS OF ARTICLES
Filed Dec. 12, 1963                        3 Sheets-Sheet 3

INVENTORS
JOHN E. MURPHY, JR.
DONALD M. JOHNSON
BY
Brumbaugh, Free, Graves & Donohue
THEIR ATTORNEYS United States Patent Office 3,268,054
Patented August 23, 1966

3,268,054
METHOD AND APPARATUS FOR ASSEMBLING AND FEEDING GROUPS OF ARTICLES
John E. Murphy, Jr., Dumont, and Donald M. Johnson, Upper Saddle River, N.J., assignors to Lever Brothers Company, New York, N.Y., a corporation of Maine
Filed Dec. 12, 1963, Ser. No. 330,167
11 Claims. (Cl. 198—20)

The invention relates to a method and apparatus for arranging articles such as discs, tablets, wafers and the like into groups for packaging, and, more particularly, to a method and apparatus for sorting articles into aligned, uniform groups and transferring the groups to other machines for wrapping and packaging.

The demand for consumer goods characterizing the twentieth century, and the development of high speed manufacturing equipment to satisfy this demand, has imposed a severe burden on conventional packaging techniques. To avoid production bottlenecks and delays caused by the application of standard packaging machinery to high speed manufacturing equipment, it has been necessary to develop new concepts in packaging technology. Thus according to these concepts, a transition machine is frequently required to match the production of delicate, frangible articles, such as compressed wafers of laundry detergent and the like, with the feed rate of the machines which package the articles for distribution and sale. Such transition machines must be capable of selecting and aligning a precise number of articles from a substantially static, random array and feeding the articles so selected to conventional packaging machines without chipping, breaking or otherwise damaging them.

In accordance with the invention, transition apparatus is provided which can close the gap between production and packaging machine feed rates for articles such as laundry detergent wafers. More particularly, the machine may have at least one article receiving means such as a pocket wheel or starwheel with a plurality of generally parallel axial recesses or grooves formed in the surface thereof to receive a predetermined plurality of specific charges of articles for alignment in groups within the grooves. Transfer means may then be provided to gently engage the groups of articles aligned within the grooves and to move the groups of articles out of the grooves at a controlled progressively accelerated rate from a substantial state of rest toward a conventional packaging or wrapping machine to arrive thereat at a speed corresponding to the infeed speed of the conveyor means of the packaging or wrapping machine. The groups of articles aligned in the grooves may be indexed, or serially presented at definite spatial intervals, for engagement with the transfer means by means of an indexing drive unit.

More particularly, the transfer means may have at least one continuously moving carrier finger set, which may be activated by a plurality of cams to carefully engage the transverse ends of the indexed group of articles at a very low speed and then move the group out of the pocket wheel at a controlled progressively accelerated rate to finally attain a speed of movement for the discharge from the apparatus corresponding to the infeed speed of the packaging machinery. The acceleration of the carrier finger set to a speed, which matches the indexing rate of the aligned groups to the feed rate of the packaging machinery, may be provided by epicyclic gears with a cam to modify the gear output. A drive shaft and a cooperating pin gear may be provided for the pocket wheel drive, the pin gear being driven by an indexing cam, to impart an intermittent indexing motion through the drive shaft to the articles in the article receiving means.

For a more complete understanding of the present invention, reference may be had to the following detailed description taken in conjunction with the accompanying figures of the drawings, in which:

FIGURE 1A is an axonometric projection of a portion of an exemplary embodiment of a transition apparatus showing portions thereof partially broken away or in partial section, in accordance with the invention;

FIG. 1B is an axonometric projection of the remaining portion of the transition apparatus partially shown in FIG. 1A and in partially overlapping relation thereto;

FIG. 3 is an axonometric projection of an exemplary form of article receiving means, in accordance with the invention.

GENERAL DESCRIPTION

Figure 2:
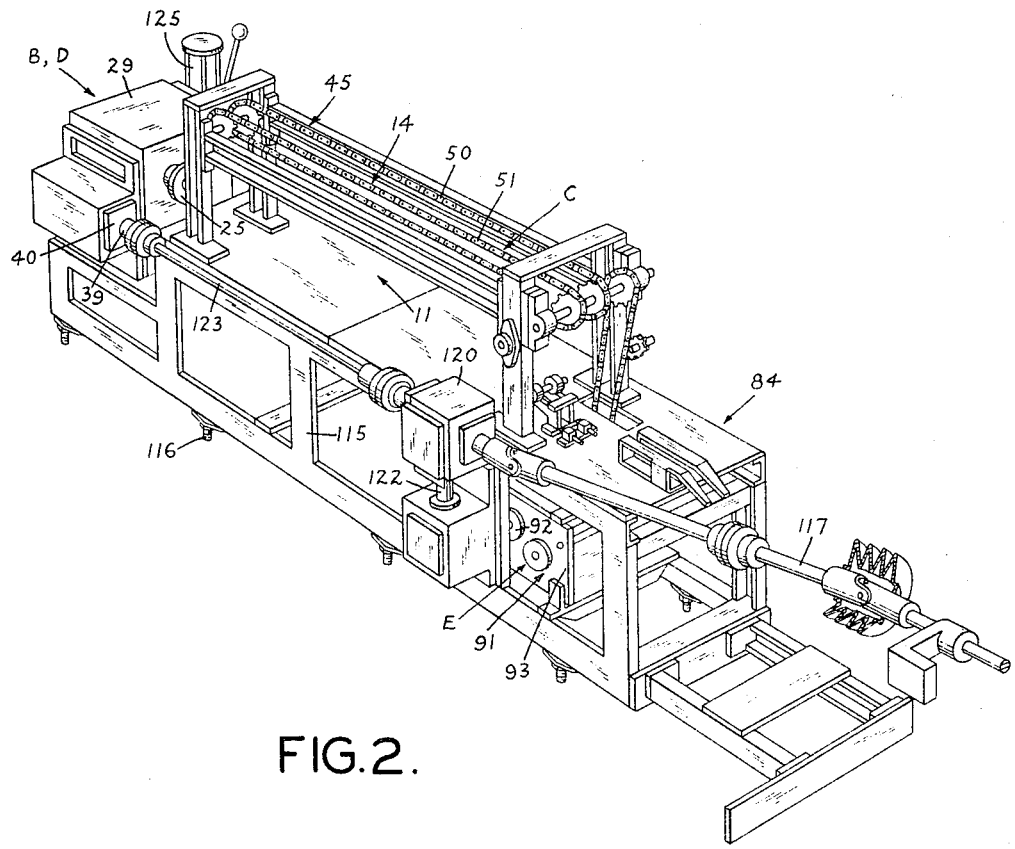
FIG. 2 is an axonometric projection of a frame and a portion of the drive mechanism for accommodating transition apparatus of the exemplary type shown in part in FIGS. 1A and 1B, the unit being oriented in a direction the reverse of that shown in FIG. 1A and 1B.

According to one embodiment of the invention, as shown in FIG. 2, a sorting unit indicated generally by the arrow 11 and shown in detail in FIGS. 1A and 1B, can be conveniently mounted on a frame 115. More particularly, as illustrated in FIG. 1A, a hopper (not shown), which is positioned generally above the frame 115, and a series of sloped feed chutes (not shown) of any suitable construction feed a plurality of articles 13 under the influence of gravity, for example, to elongated, generally cylindrical, recessed pocket wheels or starwheels 15 forming article receiving means. The capacity of semi-circular, longitudinal recesses or grooves 14 formed in the peripheral surface of the starwheels 15 limits the number of the articles 13 which can be received under gravity flow from the feed chutes when in a first predetermined position to a preselected amount. The recesses 14 further align the articles into respective groups 12. The starwheels 15 intermittently rotate through a pedetermined angle, indexing the aligned groups 12 of articles 13 to a second predetermined position in which they are susceptible of engagement by respective carrier finger sets 46. Each indexed group 12 is gently clasped by a respective carrier finger set 46 which moves the articles 13 from a substantial state of rest out of the respective recesses in the starwheels 15 and toward a conventional wrapping machine, the details of which are not shown, but indicated generally by the arrow 84, at a controlled progressively accelerated rate to match the infeed speed of the wrapping machine 84.

More particularly the sorting unit 11 includes a plurality of Article Receiving Means A in which the articles 13 are arranged in serially aligned groups 12 in the peripheral recesses or grooves of the starwheels 15. The grouped articles are indexed by a specific, intermittent, step-like rotary motion imparted to the starwheels 15 by an indexing cam 33, within an Indexing Drive Unit B. A Carrier Finger Actuating Unit D, which enables the serially indexed groups of articles 12 in the starwheels 15 to be gently clasped within the carrier finger sets 46, cooperatively functions with a Transfer Means C, and a Transfer Drive Mechanism E to discharge the groups 12 of articles from the unit 11 at a predetermined speed.

ARTICLE RECEIVING MEANS

The cylindrical surface of each starwheel 15 (as shown in detail in FIG. 3) is provided with six equally spaced, semicircular grooves 14 which are serially pivoted first into a loading position 16 and then into a transfer position 17, as shown in FIGS. 1A and 3. An empty recess or groove 14 is rotated about the longitudinal axis of its respective starwheel 15, into the loading recess position 16 to be gravity fed with the articles 13 from the associated feed chute (not shown), while a groove 14 containing a group of articles is rotated into a topmost transfer recess position 17 for each 60° rotation of the starwheels 15.

The recess 14 when in the loading position 16 functions to appropriately align the articles 13, while a projection 18 on a rearward plate 19, transversely engaging the exposed face of the rearmost article 13 in the group, and a similar projection (not shown) on a forward plate 20, transversely engaging the exposed face of the leading article 13 in the group, prevent the articles 13 from spilling out of the recess 14 while it is in the loading position 16.

The starwheels 15 are suitably joined to each other by couplings 22 and 23 and are intermittently indexed about their longitudinal axes by a starwheel drive shaft 21 which is supported for rotation by conventional pillow blocks 24 and driven by the Indexing Drive Unit B.

INDEXING DRIVE UNIT B

The 60°, step-like, indexing rotation of the starwheels 15 in the sorting unit 11, as shown in FIG. 1B, is imparted to the starwheel drive shaft 21 by a taper lock coupling 25 driven by a longitudinally disposed indexing drive shaft 26. The indexing drive shaft 26, conventionally journaled by suitable means 27 and 28 in an index unit drive housing 29, is driven by a cam actuated pin gear 30. Cam rolls 31 on the pin gear 30 each intermittently ride in a suitably spiralled cam groove 32 formed in the periphery of a cylindrical indexing cam 33. The indexing cam 33 when rotated by an indexing unit input drive shaft 34 imparts a smooth, intermittent motion to the pin gear 30 by successively engaging each of the cam rolls 31 in sequence within the cam groove 32.

The cylindrical indexing cam 33 is keyed to the indexing unit input shaft 34 which is journaled by suitable conventional means 35 and 36 in the index unit drive housing 29. A miter gear 37, fixedly mounted on one end of the index unit input shaft 34, is driven by a second miter gear 38, fixed to a longitudinal stub shaft 39 mounted in conventional bearings 40 and 41 in the indexing drive housing 29, which may be driven, for example, by or in synchronism with the power source of the wrapping machine 84.

The direction of rotation of the starwheels 15 mounted in the sorting unit 11 must be correlated to the location of the inclined feed chutes. The direction of rotation of the starwheels 15 (as shown by the arrows in FIG. 1B) may be reversed by moving the miter gear 38 to the opposite side of the miter gear 37, i.e. toward the bearings 41 and the removable end plate 42. Thus the transfer apparatus may be made to function as a right hand or a left hand unit.

TRANSFER MEANS C

The carrier finger sets 46, which move the grouped articles 13 away from the Article Receiving Means A toward the wrapping machine 84 at a controlled progressively accelerated rate of speed are comprised of pivoted rear fingers 48, and pivoted front compression or antitipping fingers 47 having a covering 49 formed of a material such as sponge rubber or urethan.

The front carrier fingers 47 are pivotally mounted at their bases between two substantially parallel courses of endless carrier means or link chain 50 and 51. Springs 52 and 53, connected to points on the carrier fingers 47 spaced from their pivot axis and to crossbars intermediate the carrier means 50 and 51, bias the pivoted front carrier fingers 47 into an upright position, to protrude away from the carrier means 50 and 51 and toward the starwheels 15.

The carrier finger sets 46 are driven by the Transfer Drive Mechanism E at a controlled varying rate of speed, as will be explained hereinafter, so that they are in a nearly stopped condition at the time they pick up the articles 13 to assure a smooth shockfree pickup. They are then accelerated to a speed equal to or slightly greater than the infeed of the wrapping machine.

CARRIER FINGER ACTUATING UNIT D

The carrier fingers 47 are pivotally retracted, by pressing finger actuating cams 54, mounted on the lower surface of a retractable slotted bar 55, against the bases of the pivoted front compression fingers 47, clearing the indexing grouped articles 13 in the grooves 14 of the starwheels 15 as they come into their respective transfer positions 17. As each retracted front compression finger 47 approaches the end of the starwheel 15 immediately below, the finger actuating cams 54 and the slotted bar 55 draw upwardly, and the springs 52 and 53 erect the front compression fingers 47, placing them in gentle compressive or anti-tipping engagement with the aligned and indexed groups 12.

The slotted bar 55 and the finger actuating cam 54 are controlled in synchronism with the indexing of the article receiving means, through a cam operated linkage means, by the indexing unit input shaft 34. A hub 56, keyed to the index unit input shaft 34, is adjustably attached to a carrier finger lifting cam 57. A cam roll 58 riding in an eccentric cam groove 59 formed in the face of the carrier finger lifting cam 57 imparts a rocking motion to an arm 60 keyed to a transverse crossshaft 61 which has been journaled by conventional means 62 to the frame 115. The rocking motion of the arm 60 is communicated to bell crank mechanisms 64 (FIG. 1B) and 65 (FIG. 1A), pivotally mounted on the frame 115 by lugs 69 and 70, by an adjustable bracket 66. The adjustable bracket 66 connects the cross-shaft 61 with actuating rods 67 and 68 to pivotally move each of the bell cranks 64 and 65 in response to the cam 57. The amount of lift of the flinger actuating cam 54 and thereby the degree to which the front compression fingers 47 are pivoted as they pass over the article receiving means 15 is controlled by the adjustment of the braket 66.

Cam lifting rods 71 (FIG. 1B) and 72 (FIG. 1A) pivotally fixed to the respective bell cranks 64 and 65 by rod end bearings 73 and 74, transmit the motion of the bell cranks 64 and 65 in a conventional manner to the finger actuating cams 54 through actuating arms 75 and 76 and rocker shafts 77 (FIG. 1B) and 78 (FIG. 1A) which have been journaled to the frame 115.

The motion of the rocker shafts 77 and 78 causes slotted arms 81 and 82, also keyed to rocker shafts 77 and 78, respectively, to pivot through an arc. The slotted arms 81 and 82 alternately raise and depress the slotted bar 55 and the associated finger actuating cams 54 in response to the transmitted motion of the bell cranks 64 and 65.

Thus when the cam-controlled slotted arm 81 and the slotted arm 82 are pivoted in opposite directions the arms co-act to raise the slotted bar 55 and the finger actuating cams 54 back to a fully retracted position between carrier means 50 and 51 and out of engagement with the bases of the front compression fingers 47.

TRANSFER DRIVE MECHANISM E

The synchronized acceleration of the groups 12 of the articles 13 from an almost motionless condition or state of rest in the transfer recess position 17 to a rate of speed matching the infeed rate of the sorting unit 11 to that of the wrapping machine 84 is provided by the carrier finger sets 46 which move the respective groups 12 over troughs 85 and 87 (FIG. 1A) to a discharge section 83 at a progressively accelerated rate of speed to match that of wrapper infeed lugs 86 of the wrapping machine 84 pivoting upwardly into the trough 87 through a slot 88 formed therein to smoothly engage the groups 12. When the groups 12 are fully engaged by the wrapper infeed lugs 86, the rear carrier fingers 48 are rotated upwardly and out of contact with the groups 12, thus smoothly transferring the groups 12 to the wrapping unit 84 without chipping or breaking the articles 13. Moreover, the speed of the lugs 86, and the speed of the fingers 47 and 48, as well as their position relative to each other, are closely matched to insure the transfer of complete, aligned groups 12 to the wrapping unit 84.

Epicyclic gear means 91 in the Transfer Drive Mechanism E are driven by a lower bevel gear 89 keyed to a main planetary gear drive shaft 90, and provide the power input required to mesh the carrier finger sets 46 with the wrapper infeed lugs 86. A main planetary driving gear 94 drives an idler gear 95 rotatably mounted on a rocker shaft 96. The idler gear 95 in turn drives a pair of freely rotating transfer gears 97 mounted on a transverse planetary gear shaft 98. The transfer gears 97 turn an output gear 99, rotatably mounted on the rocker shaft 96 thus completing an epicyclic gear train.

The output gear speed of the epicyclic gear means 91 is modified to provide the required intermittently accelerated motion for the carrier finger sets 46 and the grouped articles 12 through the action of a cam means 100, keyed to the main planetary gear drive shaft 90. An arm and cam roll 101 fixed to the rocker shaft 96, and driven by the rotating cam means 100, drives the rocker shaft 96 in rocking motion through a predetermined arc. A rocker arm 102 keyed to the end of the rocker shaft 96, causes the planetary gear shaft 98, affixed thereto, to rock through the same arc as the rocker shaft 96. Thus transfer gears 97, rocked by one planetary gear shaft 98, either add to, or subtract from, the input gear speed of the main planetary driving gear 94.

The variable speed of the transfer gears 97 is communicated to the output gear 99 to drive a sprocket driving gear 103 keyed to a sprocket driving shaft 104. An endless driving chain 106 meshing with and driven by an output sprocket 105 on the sprocket driving shaft 104 turns a sprocket 107 keyed to a carrier chain drive shaft 108 mounted above the discharge section 83, thereby providing synchronized power for a suitable arrangement of sprockets 109, 111, 112, 113 and 114 driving the carrier means or link chains 51 and 52.

OPERATION

In operation, the articles 13 are fed in a random manner into inclined feed chutes (not shown) in either a left or right hand feed. The feed chutes present an array of specific articles 13 to each of the starwheels 15 at the respective loading recess positions 16. The articles 13, still under gravitational influence, fill the appropriate starwheel recesses, the sides of the recesses aligning the articles 13 into groups, while the projection 18 on the rearward plates 19 and a similar projection (not shown) on the forward plates 20 prevent the articles from falling out of the ends of the grooves while at the loading recess positions 16.

At the same time as the articles 13 are being formed into aligned groups 12 in the loading recess position 16 of the starwheels 15, previously aligned groups 12, which have been indexed into the topmost transfer recess position 17, are engaged by the carrier finger sets 46. A vertically upward movement of the finger actuating cams 54 permits the front compression fingers 47 to pivot downwardly toward the discharge end of the starwheels 15, gently pressing against the respective aligned groups 12.

Each of the groups 12, clasped within the carrier finger sets 46, are accelerated in a straight line, from an almost motionless state, out of the starwheels 15 up to a suitable transfer speed, wherein the wrapper infeed lugs 86, traveling at substantially the same speed, mesh with the corresponding rear carrier fingers 48. Thus a smooth discharge of articles 13 into the wrapping unit 84 is accomplished.

When all of the groups 12 have been transferred to the packaging unit 84 the starwheel drive shaft 21 is turned through a 60° angle, pivoting the starwheel recesses 14 occupying the loading recess positions 16 up into the topmost transfer recess position 17, whereupon the operational cycle hereinbefore described repeated.

The frame 115 has adjustable legs 116 to assure uniform frame contact with an uneven floor. Leg adjustment and frame positioning must be accomplished in such a manner as not to impart a springing action to the frame 115, otherwise the articles 13 may be jarred and broken during indexing and transfer.

All mounting surfaces on the frame 115 are preferably accurately machined and covered with ground steel plates for precise alignment of the machine components to reduce wear and breakage.

The power input to the sorting apparatus may be provided by any convenient means, as, for example, by a universally jointed input shaft 117, shown in FIG. 2 which may be driven by the power source of the wrapping machine 84, for example, delivering power to the two bevel gears 118 and 119 (FIG. 1A) in an oil filled bevel gear housing 120 (FIG. 2). The bevel gears 118 and 119 split the power input. The gear 118 rotates in the horizontal plane to drive the epicyclic gear means 91 of the Transfer Drive Mechanism E through the bevel gears 121 and 89. The bevel gear 119, rotating in a transverse vertical plane, drives a longitudinal shaft 123 to provide power to the Indexing Drive Unit B and the Carrier Finger Actuating Unit D through the bevel gear 38 (FIG. 1B).

A hinged cover 124 formed of some suitable transparent material such as Plexiglas, may be placed above the carrier means or link chains 50 and 51 for operator safety as well as to keep dust and other foreign objects from falling onto the moving chains. A suitable lubrication system 125 may also be provided to assure distribution of proper lubrication to all bearing points.

Thus there is provided, in accordance with the invention, a novel and improved method and apparatus for accommodating the production of specific articles to packaging machine feed rates used for packaging groups of the articles. Apparatus built according to the present invention can feed groups of articles to wrapping machines and the like, at speeds in excess of 180 groups per minute. As a further advantage, this novel apparatus can be adapted to handle articles of various sizes by simple replacement of the starwheels 15.

It will be obvious to those skilled in the art that the above described exemplary embodiment is susceptible of modification and variation without departing from the spirit and scope of the invention. Therefore, the invention is not deemed to be limited except as defined by the appended claims.

We claim:

1. A method for transferring pluralities of individual articles in predetermined serially aligned groups from a source of supply to a mechanism having an infeed operating at a predetermined speed, comprising the steps of feeding a plurality of individual articles to a first predetermined location, aligning a predetermined plurality of the individual articles serially in a group at said first predetermined location, indexing the serially aligned group to a second predetermined location to facilitate transfer of the serially aligned group to the mechanism, moving the serially aligned group from the second predetermined location to the mechanism input, and varying the speed of movement of the group at a controlled progressively accelerated rate from a state of substantial rest at the second predetermined location to a speed corresponding to the predetermined infeed speed of the mechanism.

2. A method for transferring pluralities of individual articles in predetermined serially aligned groups from a source of supply to a mechanism having an infeed operating at a predetermined speed, comprising the steps of feeding pluralities of individual articles to a plurality of first predetermined locations, aligning at each of the first predetermined locations predetermined pluralities of individual articles in respective serially aligned groups, indexing each of the respective serially aligned groups to distinct second locations to facilitate transfer of the serially aligned groups seriatim to the mechanism, moving the serially aligned groups from the respective second predetermined locations to the mechanism input, and varying the speed of movement of the groups at controlled progressively accelerated rates from a state of substantial rest at the respective second predetermined locations to a speed corresponding to the predetermined infeed speed of the mechanism.

3. Apparatus for aligning predetermined pluralities of articles serially in groups and transferring the groups of serially aligned articles from a source of supply to a conveyor means, comprising at least one article receiving means having a plurality of generally parallel grooves for respectively aligning predetermined pluralities of articles serially into groups, transfer means for engaging said groups of serially aligned articles while positioned in said article receiving means and moving the respective groups of serially aligned articles out of said grooves seriatim, and drive means for said article receiving means for indexing said respective groups of serially aligned articles serially in a position susceptible of engagement with said transfer means.

4. Apparatus for aligning predetermined pluralities of articles serially in groups and transferring the groups of serially aligned articles seriatim from a source of supply to a common conveyor means, comprising a plurality of article receiving means each having a respective plurality of generally parallel grooves for respectively aligning predetermined pluralities of articles serially into groups, transfer means for engaging said groups of serially aligned articles while positioned in said respective article receiving means and serially moving the respective groups of serially aligned articles out of said grooves for transfer to the common conveyor means, and drive means for said respective article receiving means for indexing said respective groups of serially aligned articles serially in a position susceptible of engagement with said transfer means.

5. Apparatus for aligning predetermined pluralities of articles serially in groups and transferring the groups of serially aligned articles from a source of supply, comprising conveyor means operating at a predetermined speed, at least one article receiving means having a plurality of generally parallel grooves for respectively aligning predetermined pluralities of articles serially into groups, transfer means for engaging said groups of serially aligned articles while positioned in said article receiving means and moving the respective groups of serially aligned articles out of said grooves seriatim at a progressively accelerated rate from a substantial state of rest to a speed of movement corresponding to the predetermined operating speed of said conveyor means, and drive means for said article receiving means for indexing said respective groups of serially aligned articles serially into a position susceptible of engagement with said transfer means.

6. Apparatus as claimed in claim 5, wherein said article receiving means comprises an elongated starwheel having a plurality of elongated parallel grooves formed in the surface thereof.

7. Apparatus as claimed in claim 6, wherein said drive means includes an indexing drive shaft for said starwheel, a pin gear secured to said drive shaft, and a cooperating rotatable indexing cam for intermittently driving said pin gear.

8. Apparatus as claimed in claim 5, wherein said transfer means comprises at least one continuously moving carrier finger set adapted to selectively engage a respective one of said indexed groups of articles, a finger actuating cam cooperatively arranged to engage said carrier finger set with the aligned groups of articles in said starwheel, a rotatable lifting cam, and linkage means responsive to the rotation of said lifting cam for operating said finger actuating cam.

9. Apparatus as claimed in claim 5, comprising transfer drive mechanism for changing the speed of operation of said transfer means in a predetermined manner in cooperative relation to said article receiving drive means.

10. Apparatus as claimed in claim 5, wherein said drive means is intermittently operated, and said transfer means comprises at least one carrier means adapted to be disposed and move about said article receiving means, a plurality of carrier finger sets cooperating with said moving carrier means and adapted to engage the serially indexed groups of articles, epicyclic gear means in driving engagement with said carrier means, and a cam means for modifying the operative engagement of said epicyclic gear means with said carrier means to control speed of movement thereof.

11. Apparatus as claimed in claim 10, wherein said plurality of carrier finger sets each comprises a rear carrier finger projecting in a generally perpendicular direction of said carrier means and adapted to transversely engage the exposed surface of the rearmost article in one of the indexed groups of articles, a biased front compression finger adapted to pivot downwardly to engage the foremost article in the group of articles in cooperation with said rear carrier finger, a finger actuating cam operatively pivoting said biased front compression finger away from said article receiving means during indexing thereof, a carrier finger lifting cam, and linkage means cooperatively engaging said carrier finger lifting cam with said finger actuating cam for activating said carrier finger sets.

References Cited by the Examiner

UNITED STATES PATENTS 1,825,058  9/1931  Goldstein _____ 221—233

EVON C. BLUNK, *Primary Examiner.*

RICHARD E. AEGERTER, *Examiner.*